United States Patent

Smart et al.

[11] Patent Number: 5,614,976
[45] Date of Patent: Mar. 25, 1997

[54] CAMERA WITH MANUAL FILM REWIND LOCKED WHEN CASSETTE CLOSED, PREFERABLY TO POSITION FILM EXPOSED INDICATOR IN WINDOW OF CASSETTE

[75] Inventors: David C. Smart, Rochester; Thomas E. Dussinger, Henrietta, both of N.Y.

[73] Assignee: Eastman Kodak Company, Rochester, N.Y.

[21] Appl. No.: 590,792

[22] Filed: Jan. 24, 1996

[51] Int. Cl.$^6$ .............................. G03B 1/10; G03B 17/26
[52] U.S. Cl. .......................................... 396/392; 396/285
[58] Field of Search ................................. 354/174, 212, 354/213, 214, 215, 277, 288

[56] References Cited

U.S. PATENT DOCUMENTS

| | | | |
|---|---|---|---|
| 3,628,432 | 12/1971 | Ettischer . | |
| 4,751,536 | 6/1988 | Ohmura et al. | 354/75 |
| 5,079,579 | 1/1992 | Pagano et al. | 354/288 |
| 5,231,438 | 7/1993 | Smart | 354/281 |
| 5,357,303 | 10/1994 | Wirt | 354/275 |
| 5,359,378 | 10/1994 | Zander et al. | 354/275 |
| 5,384,613 | 1/1995 | Cloutier et al. | 354/275 |
| 5,481,325 | 1/1996 | Wada et al. | 354/173.1 |
| 5,495,310 | 2/1996 | Takatori | 354/288 |
| 5,497,212 | 3/1996 | Kawamura et al. | 354/21 |
| 5,506,650 | 4/1996 | Stephenson, III et al. | 354/275 |
| 5,555,063 | 9/1996 | Balling | 354/288 |

*Primary Examiner*—Safet Metjahic
*Assistant Examiner*—John Chizmar
*Attorney, Agent, or Firm*—Roger A. Fields

[57] ABSTRACT

A camera for use with a film cassette having a spool rotatable to wind an exposed filmstrip including a trailing film end portion into the cassette and a light lock movable to be closed after the trailing film end portion is wound into the cassette, comprises a manual film winder rotatable in engagement with the spool in a film winding direction to rotate the spool in the same direction to wind the exposed filmstrip including the trailing film end portion into the cassette and locking means coupled with the light lock to prevent further rotation of the film winder in the film winding direction when the light lock is closed. Preferably, the cassette has an indicator flag rotatable coaxially with the spool to be positioned in an indicator window of the cassette to provide a visual film-exposed warning when the spool is at a predetermined angle of rotation, and the locking means secures the film winder at the same angle of rotation to position the indicator flag in the indicator window of the cassette when the light lock is closed.

5 Claims, 11 Drawing Sheets

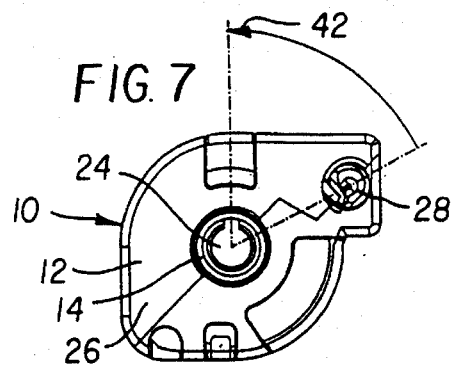
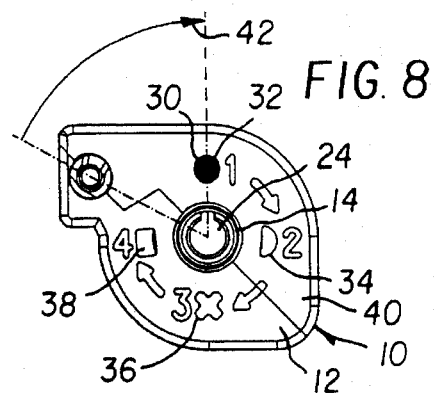
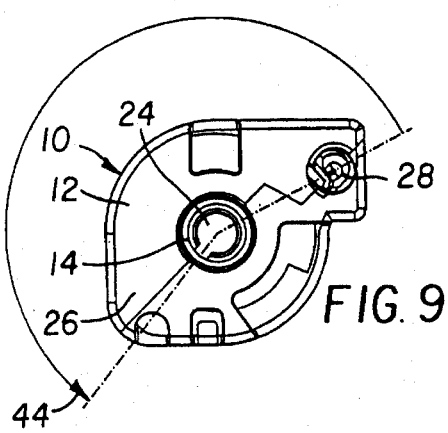
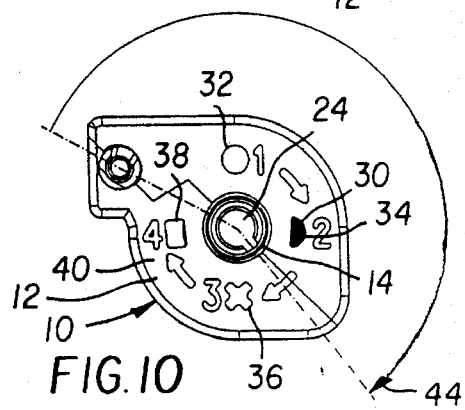
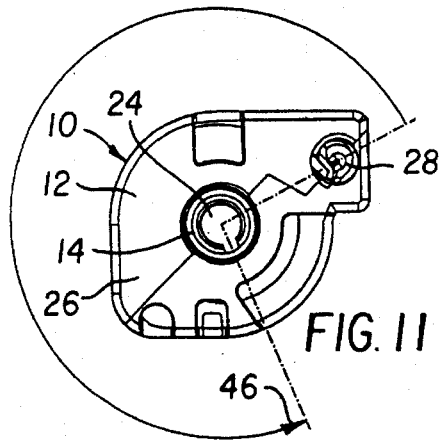
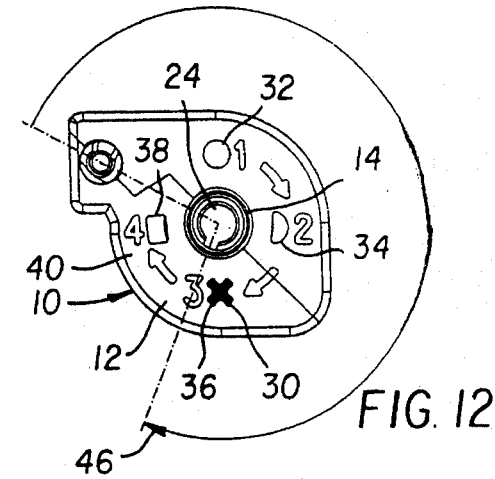
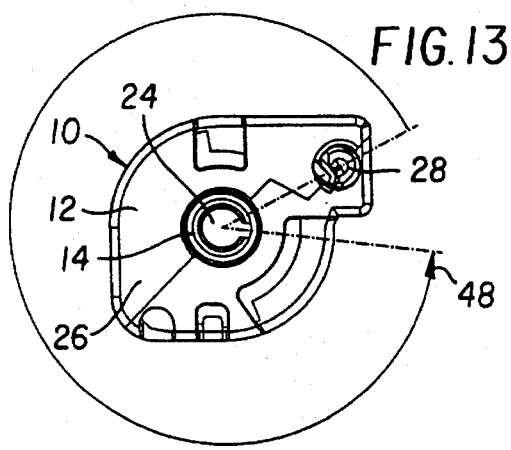
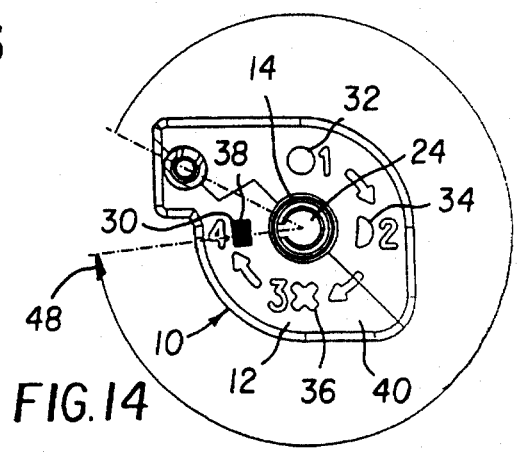

CAMERA WITH MANUAL FILM REWIND LOCKED WHEN CASSETTE CLOSED, PREFERABLY TO POSITION FILM EXPOSED INDICATOR IN WINDOW OF CASSETTE

CROSS-REFERENCE TO RELATED APPLICATIONS

Reference is made to commonly assigned copending applications Ser. No. 08/371336, entitled APPARATUS AND METHOD FOR CLOSING LIGHT LOCK OF FILM CASSETTE AND UNLOADING CASSETTE FROM CAMERA and filed Jan. 11, 1995 in the names of David C. Smart and Thomas E. Dussinger, application Ser. No. 08/590,968, entitled CAMERA WITH FILM SENSOR AND DRIVER TO INITIATE CLOSING OF CASSETTE RESPONSIVE TO RETURN OF FILMSTRIP TO CASSETTE and filed Jan. 29, 1996 in the names of David C. Smart and Douglas H. Pearson, application Ser. No. 08/590, 662, entitled ONE-TIME-USE CAMERA HAS DRIVER FOR CLOSING FILM CASSETTE WHICH IS REMOVED WITH CLOSED CASSETTE TO DISABLE CAMERA AFTER COMPLETED USE and filed Jan. 24, 1996 in the names of David C. Smart and Douglas H. Pearson, application Ser. No. 08/590,666, entitled ONE-TIME-USE CAMERA HAS DRIVER FOR CLOSING FILM CASSETTE WHICH IS BROKEN TO DISABLE CAMERA AFTER COMPLETED USE and filed Jan. 24, 1996 in the names of David C. Smart and Douglas H. Pearson, application Ser. No. 08/590,717, entitled ONE-TIME-USE CAMERA UNCOVERS INGRESS OPENING FOR INSERTION TOOL TO EJECT CASSETTE WHEN CASSETTE CLOSED and filed Jan. 24, 1996 in the names of David C. Smart and Thomas E. Dussinger, and application Ser. No. 08/590,719, entitled ONE-TIME-USE CAMERA WITH LID FLEXED TO UNCOVER CHAMBER WHEN CASSETTE FORCIBLY EJECTED FROM CHAMBER and filed Jan. 24, 1996 in the names of David C. Smart and Ralph M. Lyon.

FIELD OF THE INVENTION

The invention relates generally to the field of photography, and in particular to cameras to be used with film cassettes. More specifically, the invention relates to a camera with a manual film rewind that is locked when the film cassette is closed following return of a filmstrip to the cassette. Preferably, the manual film rewind is locked to position a film exposed indicator in a window of the cassette to provide a visual warning or indication that the filmstrip is exposed.

BACKGROUND OF THE INVENTION

Commonly assigned prior art U.S. Pat. No. 5,357,303, issued Oct. 18, 1994, discloses a film cassette having a light lock which is pivoted closed to prevent ambient light from entering the cassette interior and is pivoted open to permit film movement out of and into the cassette interior. An implement or tool is designed to engage the light lock to pivot it open and closed.

Commonly assigned prior art U.S. Pat. No. 5,231,438, issued Jul. 27, 1993, discloses a camera intended for use with a film cassette having a light lock which is pivoted closed to prevent ambient light from entering the cassette interior and is pivoted open to permit film movement out of and into the cassette interior. The camera has a release button which when manually moved in a releasing direction actuates a latching device. The latching device normally secures a door closed over a chamber holding the film cassette. However, when the latching device is actuated, it operates to pivot the light lock closed and to release the door to uncover the chamber.

SUMMARY OF THE INVENTION

A camera for use with a film cassette having a spool rotatable to wind an exposed filmstrip including a trailing film end portion into the cassette and a light lock movable to be closed after the trailing film end portion is wound into the cassette, is characterized in that:

a manual film winder is rotatable in engagement with the spool in a film winding direction to rotate the spool in the same direction to wind the exposed filmstrip including the trailing film end portion into the cassette; and locking means is coupled with the light lock to prevent further rotation of the film winder in the film winding direction when the light lock is closed.

Preferably, the cassette has an indicator flag rotatable coaxially with the spool to be positioned in an indicator window of the cassette to provide a visual film-exposed warning when the spool is at a predetermined angle of rotation, and the locking means secures the film winder at the same angle of rotation to position the indicator flag in the indicator window of the cassette when the light lock is closed.

BRIEF DESCRIPTION OF THE DRAWINGS

FIGS. 7, 8, 9, 10, 11, 12, 13 and 14 are opposite end views of the film cassette, depicting operation of a visual exposure indicator (VEI);

DETAILED DESCRIPTION OF THE INVENTION

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Film Cassette

Figure 1:
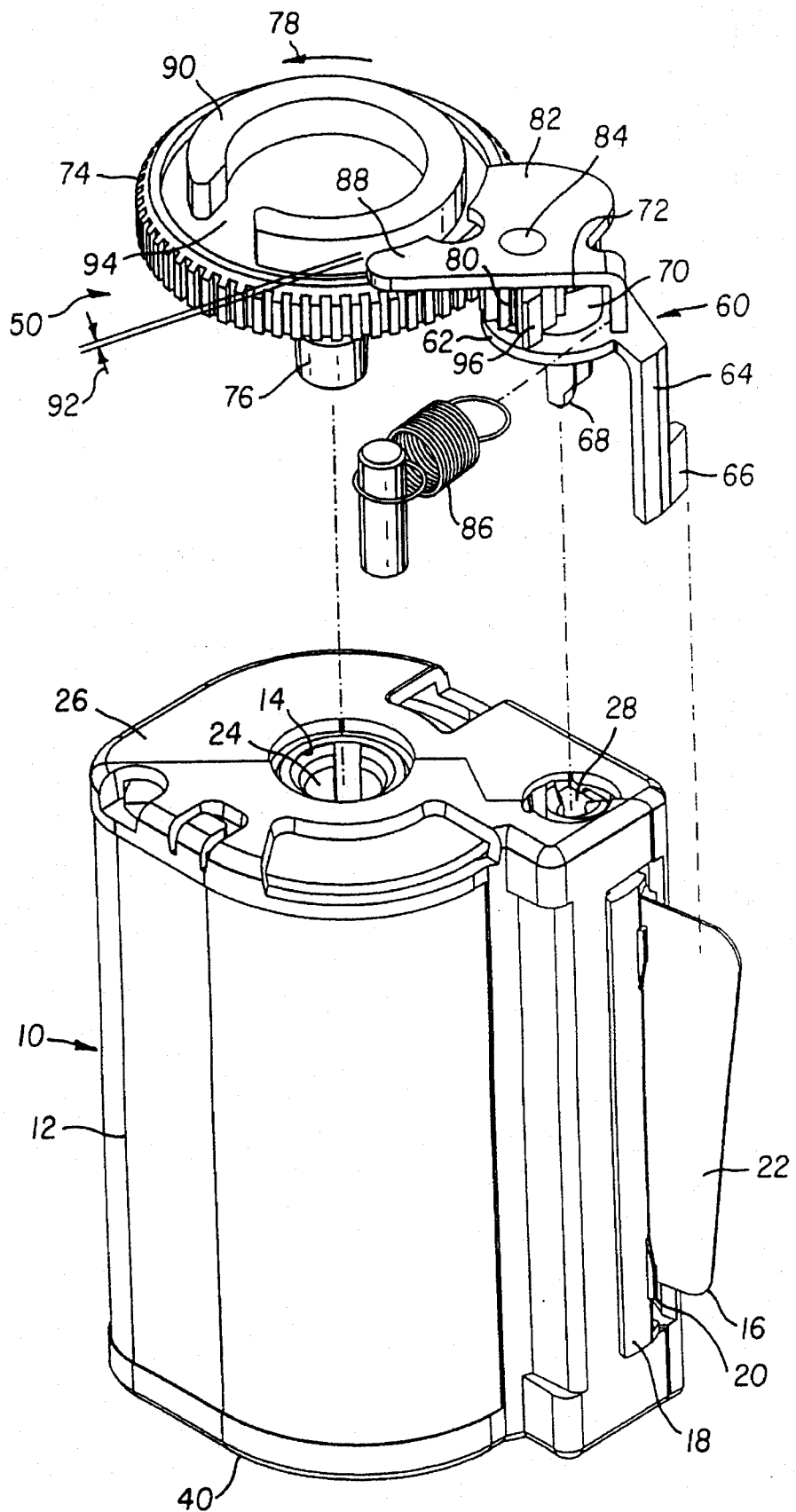
FIG. 1 is an exploded partial perspective view of a camera for use with a film cassette, according to a preferred embodiment of the invention.
Figure 2:
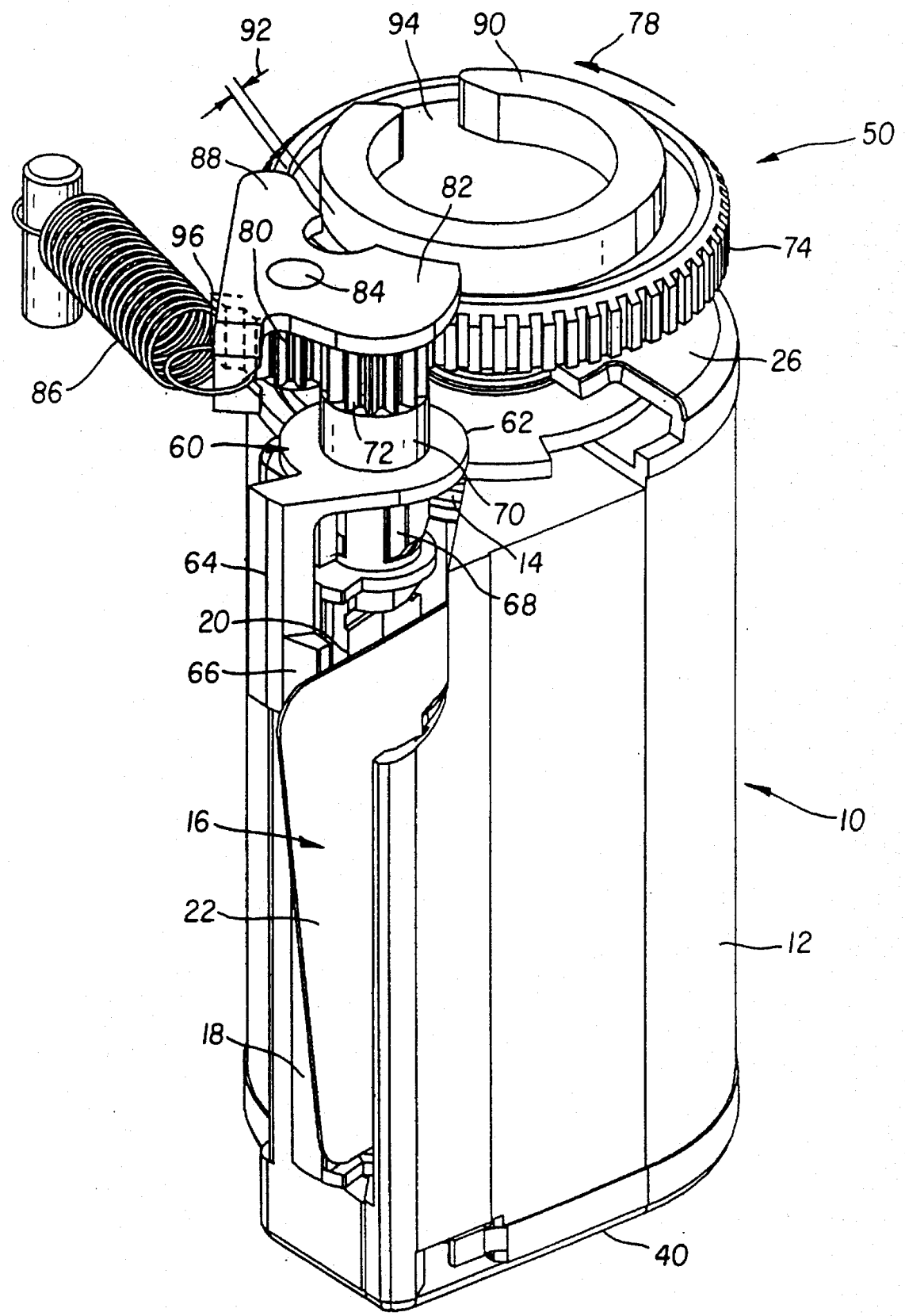
FIG. 2 is an assembled partial perspective view of the camera with the film cassette as seen from an opposite side.

Referring now to the drawings, FIGS. 1 and 2 show a film cassette 10 similar in operation to ones disclosed in prior art U.S. Pat. No. 5,357,303, issued Oct. 18, 1994, and U.S. Pat. No. 5,231,438, issued Jul. 27, 1993. The film cassette 10 includes a cassette shell 12 that contains a flanged spool 14 on which is stored a wound unexposed/exposed filmstrip 16. A slightly elastic light lock 18 is supported within a film egress/ingress slot 20 in the cassette shell 12 to be pivoted open to permit film movement out of and back into the shell, through the slot, and to be pivoted closed to prevent ambient light from entering the shell, through the slot.

Figure 6:
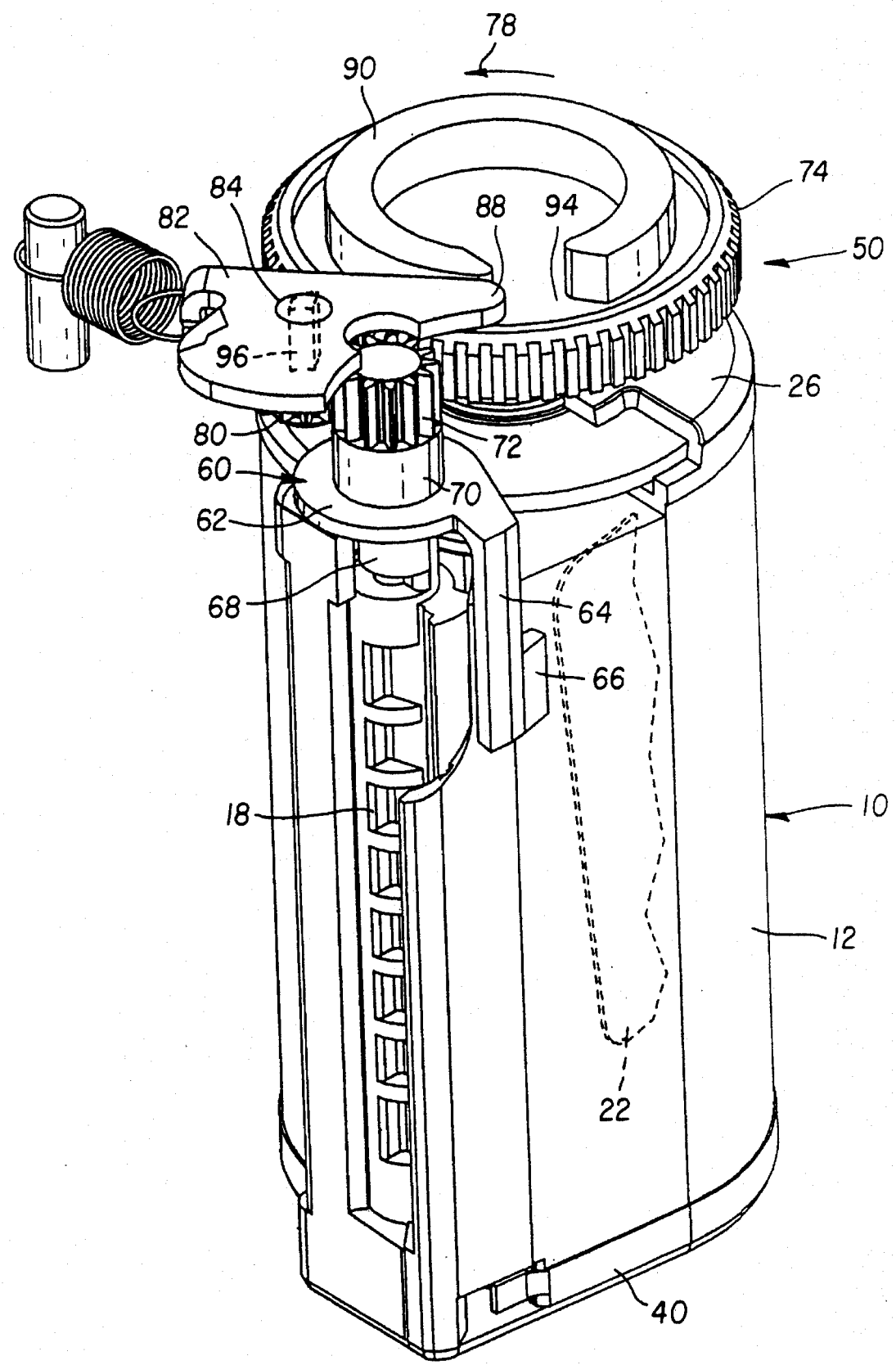

FIGS. 1 and 2 show the film cassette 10 from opposite sides, with the light lock 18 open and all but a trailing film end portion 22 of the filmstrip 16 wound into the cassette shell 12 after the filmstrip is exposed outside the cassette shell. FIG. 6 shows the light lock 18 pivoted completely closed after the trailing film end portion 22 is wound into the cassette shell 12.

The spool 14 has a coaxial drive cavity 24 accessible at a drive end 26 of the cassette shell 12 and the light lock 18 has a coaxial drive cavity 28 accessible at the same end of the cassette shell as shown in FIG. 1. A visual exposure indicator (VEI) in the form of an indicator flag 30 is rotatable coaxially with the spool 14 to be respectively positioned in four separate windows 32, 34, 36 and 38 in a VEI end 40 of the cassette shell 12 when the spool is at different predetermined angles of rotation. The VEI end 40 of the cassette shell 12 is an opposite end of the cassette shell, with respect to the drive end 26 of the cassette shell. As shown in FIGS. 7 and 8, when the spool 14 is at a predetermined acute angle of rotation 42 the indicator flag 30 is at the same angle to be positioned in the window 32, to provide a visual film-unexposed warning or indication. As shown in FIGS. 9 and 10, when the spool 14 is at a predetermined first-obtuse angle of rotation 44 the indicator flag 30 is at the same angle to be positioned in the window 34, to provide a visual film-partially-exposed warning or indication. As shown in FIGS. 11 and 12, when the spool 14 is at a predetermined second-obtuse angle of rotation 46 the indicator flag 30 is at the same angle to be positioned in the window 36, to provide a visual film-completely-exposed warning or indication. As shown in FIGS. 13 and 14, when the spool 14 is at a predetermined third-obtuse angle of rotation 48 the indicator flag 30 is at the same angle to be positioned in the window 38, to provide a visual film-processed warning or indication.

Camera

Figure 15:
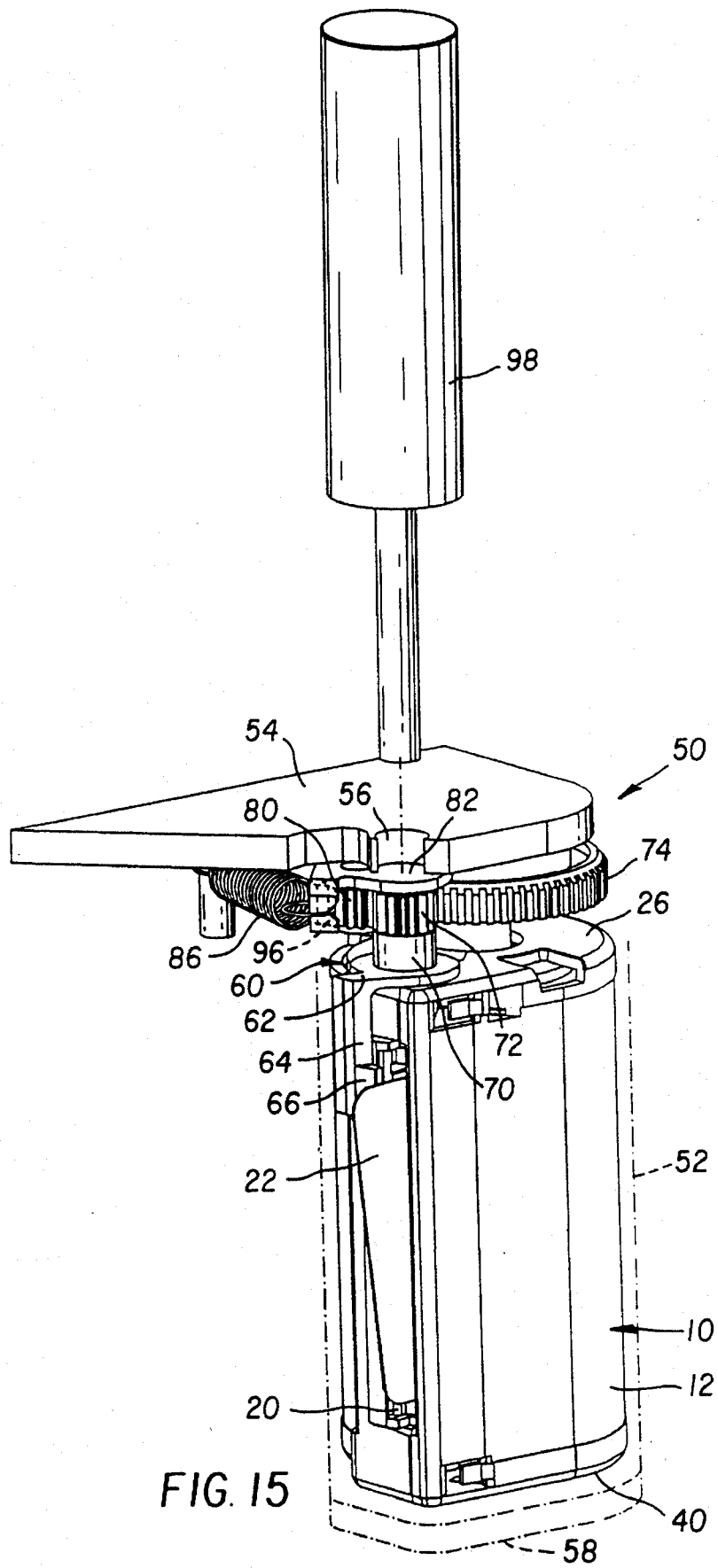
FIGS. 15, 16 and 17 are assembled partial perspective views of the camera with the film cassette, depicting how the film cassette is ejected from a cassette chamber.

A partially shown camera 50 with which the film cassette 10 is to be used is shown in FIGS. 1 and 15.

Looking at FIG. 15, the camera 50 includes a cassette chamber 52 for the film cassette 10. The chamber 52 is open at its top and bottom, and has a film egress/ingress slot (not shown) opposite the film egress/ingress slot 20 in the cassette shell 12 to permit film movement out of and back into the chamber. An exterior top housing portion 54 of the camera 50 has a tool ingress opening 56 which is located coaxially above the drive cavity 28 of the light lock 18. A bottom lid 58 of the camera 50 normally seals the chamber 52 at its bottom. The lid 58 has a thin peripheral lip (not shown) that is snugly received within the chamber 52 to removably hold the lid in place.

Looking at FIGS. 1 and 2, an actuator unit 60 for pivoting the light lock 18 closed after the trailing film end portion 22 is wound into the cassette shell 12 comprises an integral single-piece driver 62 and film sensor lever 64. The film sensor lever 64 has a sensor head 66 shown in FIGS. 1 and 2 in contact with the trailing film end portion 22. The driver 62 has a depending drive-part 68 located in the drive cavity 28 of the light lock 18 to rotationally engage the light lock in order to pivot the light lock closed, and a coaxial upstanding gear-support-part 70 on which is coaxially fixed a first spur gear 72. Rotation of the first spur gear 72 in in a counter-clockwise direction in FIGS. 1 and 2 similarly rotates the drive-part 68 to pivot the light lock 18 closed.

A manual film rewind thumbwheel 74 has a depending coaxial drive-part 76 located in the drive cavity 24 of the spool 14 to rotationally engage the spool. The thumbwheel 74 is manually rotated in a film winding direction 78 to similarly rotate the spool 14 to wind the filmstrip 16 including the trailing film end portion 22 into the cassette shell 12.

A second spur gear 80 continuously in mesh with the first spur gear 72 is coaxially fixed to a locking lever 82. A mount-pin 84 rotationally supports the second spur gear 80 and the locking lever 82, and maintains the second spur gear continuously spaced from the thumbwheel 74. As shown in FIGS. 1–4 and 15, the locking lever 82 is normally located beneath the tool ingress opening 56 in the top housing portion 54 to cover or block the tool ingress opening.

A tension spring 86 biases the locking lever 82 to rotate with the second spur gear 80 in a clockwise direction in FIG. 1 to, in turn, bias the first spur gear 72 to rotate in a counter-clockwise direction in FIG. 1 to urge the sensor head 66 of the film sensor lever 64 against the filmstrip 16. Film resistance at the sensor head 66 is greater than the bias of the spring 66. As a result, the spring 86 is prevented from urging the locking lever 82 to rotate with the second spur gear 80 in a clockwise direction in FIG. 1 in order to move one end 88 of the locking lever against an arcuate rib 90 on the thumbwheel 74. Instead, the lever end 88 is held spaced a slight distance 92 from the arcuate rib 90.

Operation

Figure 3:
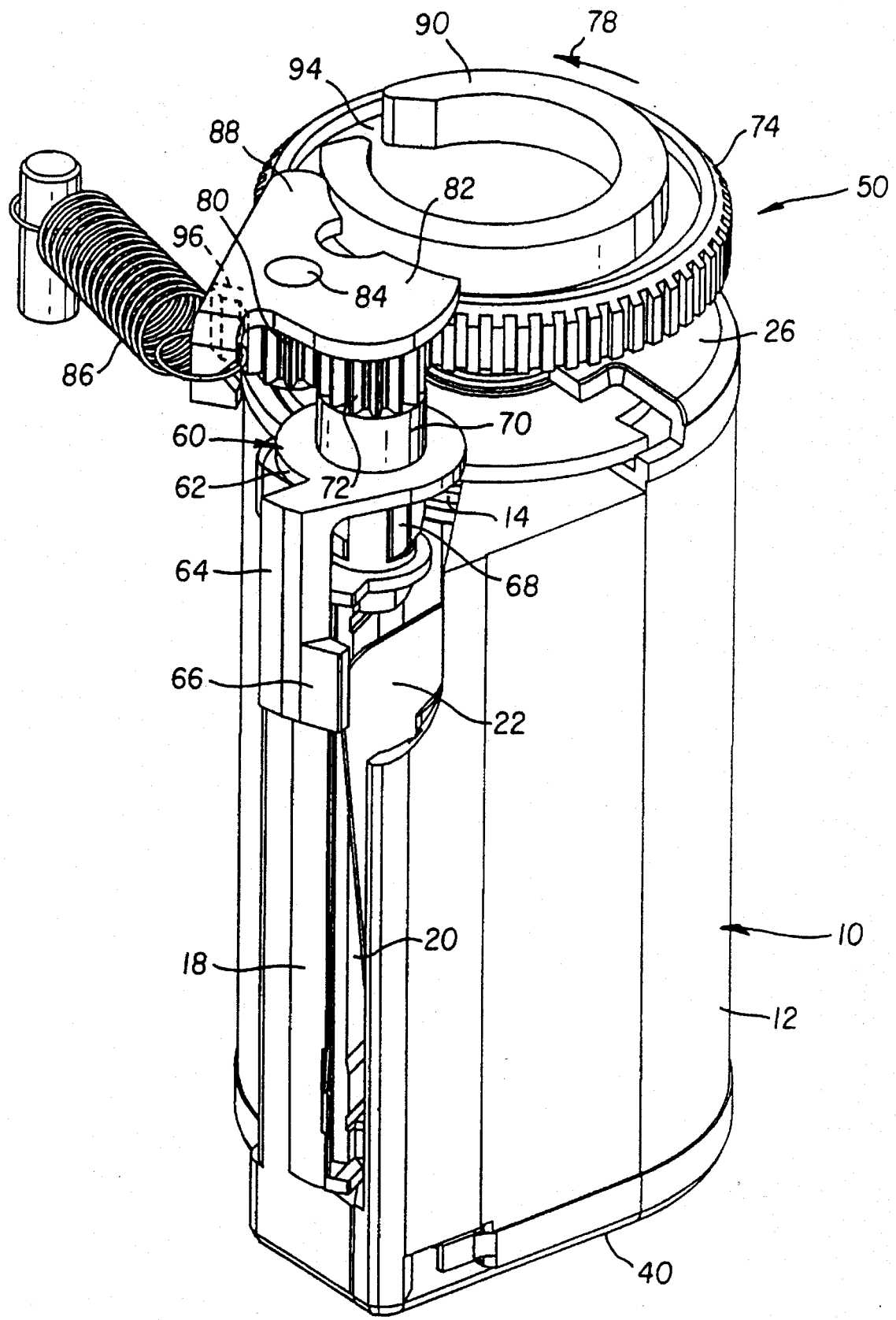
FIGS. 3, 4, 5 and 6 are assembled partial perspective views of the camera with the film cassette, depicting operation of the camera.

Going from FIGS. 1 and 2 to FIG. 3, when the thumbwheel 74 is rotated in the film winding direction 78 the trailing film end portion 22 is drawn from the sensor head 66 of the film sensor lever 64 and into the slot 20 in the cassette shell 12. Once the trailing film end portion 22 is moved clear of the sensor head 66 the resulting absence of film resistance at the sensor head allows the spring 86 to rotate the locking lever and the second spur gear 80 clockwise in FIG. 3 until the lever end 88 abuts the arcuate rib 90 on the thumbwheel 74. Consequently, the actuator unit 60 is rotated counter-clockwise in FIG. 3 via the first spur gear 72 to make the drive-part 68 similarly pivot the light lock 18 initially closed ten degrees as shown in FIG. 3, to partially (slightly) close the light lock.

Figure 4:
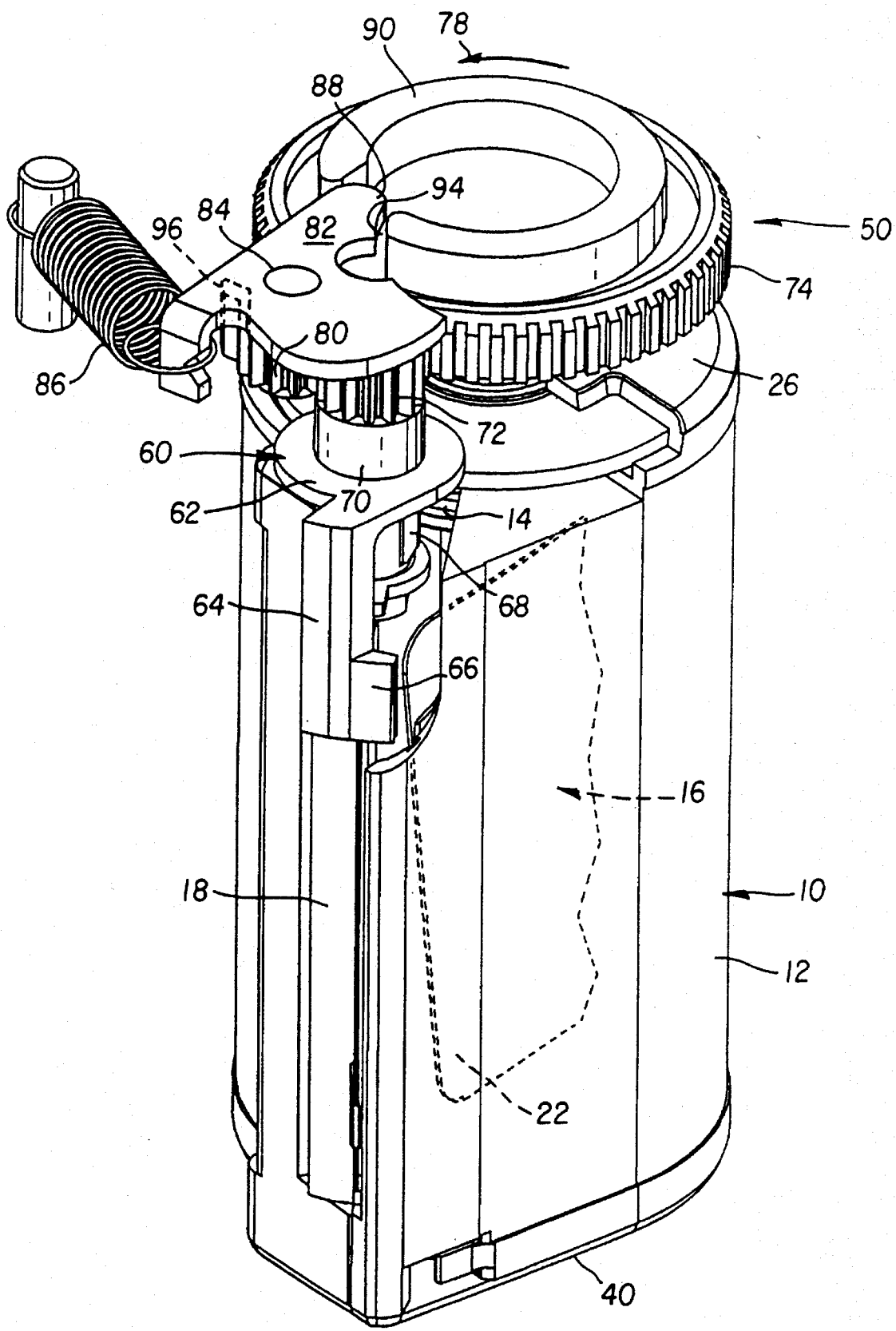

In FIG. 4, the thumbwheel 74 is rotated further in the film winding direction 78 than in FIG. 3 to draw the trailing film end portion 22 from the slot 20 and into the interior of the cassette shell 12 and to position a gap 94 in the arcuate rib 90 opposite the lever end 88. The presence of the gap 94 opposite the lever end 88 allows the spring 86 to rotate the locking lever 82 and the second spur gear 80 clockwise in FIG. 4 until the lever end is seated in the gap. Consequently, the actuator unit 60 is rotated counter-clockwise in FIG. 4 via the first spur gear 72 to make the drive-part 68 similarly pivot the light lock 18 further closed twenty degrees as shown in FIG. 4.

Figure 5:
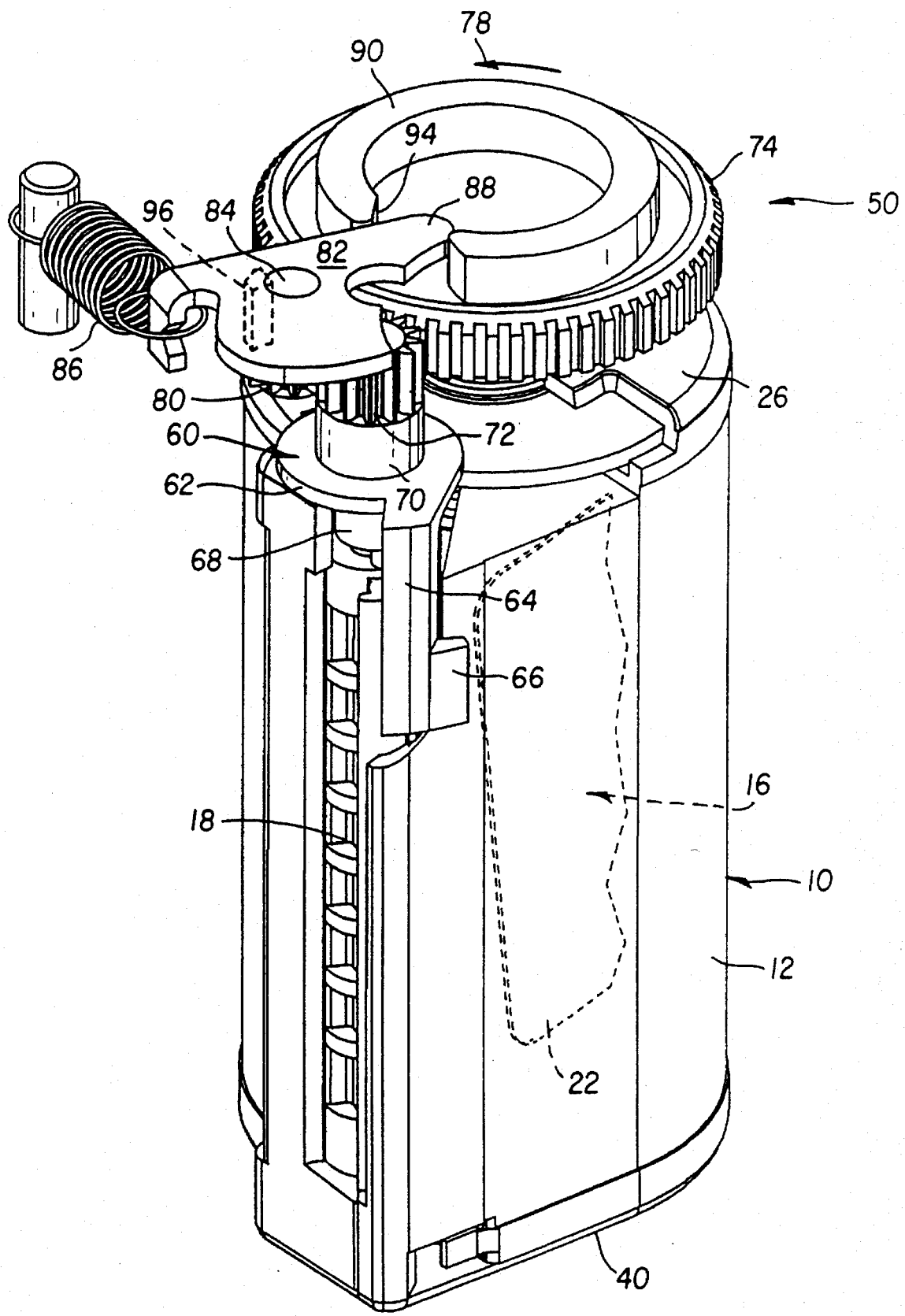

In FIG. 5, the thumbwheel 74 is rotated further in the film winding direction 78 than in FIG. 4 to draw the trailing film end portion 22 further into the interior of the cassette shell 12 and to make the arcuate rib 90 pivot the lever end 88 to rotate the locking lever 82 and the second spur gear 80 clockwise in FIG. 5. Consequently, the actuator unit 60 is rotated counter-clockwise in FIG. 5 via the first spur gear 72 to make the drive-part 68 similarly pivot the light lock 18 further closed thirty degrees as shown in FIG. 5.

In FIG. 6, the thumbwheel 74 is rotated further in the film winding direction 78 than in FIG. 5 to draw the trailing film end portion 22 further into the interior of the cassette shell 12 and to make the arcuate rib 90 pivot the lever end 88 to rotate the locking lever 82 and the second spur gear 80 clockwise in FIG. 5 until the lever end is pivoted out of the gap 94. Consequently, the actuator unit 60 is rotated counter-clockwise in FIG. 6 via the first spur gear 72 to make the drive-part 68 similarly pivot the light lock 18 further closed thirty-two degrees as shown in FIG. 6, to completely close the light lock.

Figure 16:
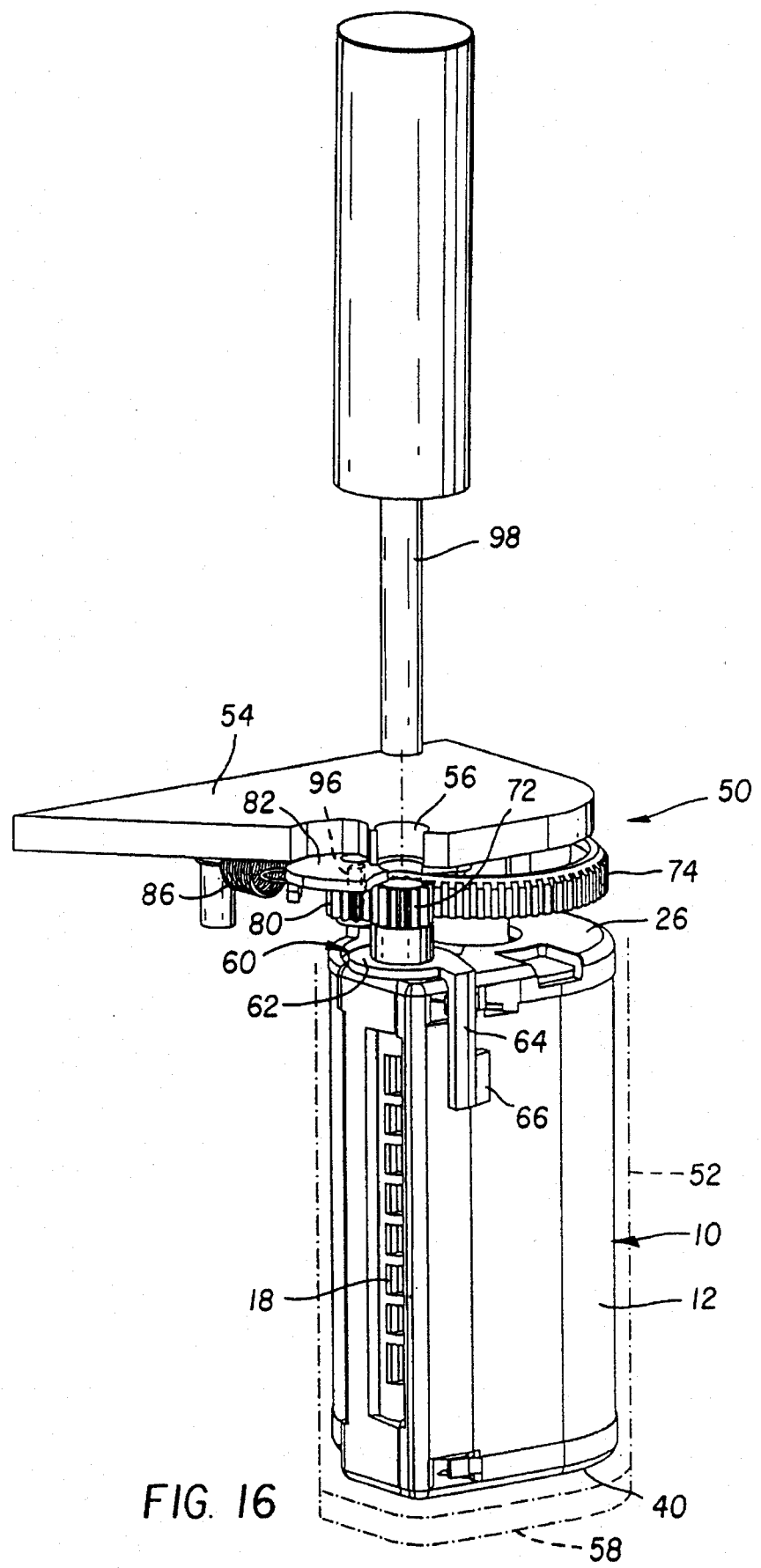

At this time, a locking tooth 96 on the underside of the locking lever 82 is moved into engagement with the thumbwheel 74 to prevent further rotation of the thumbwheel in the film winding direction 78 as shown in FIGS. 6 and 16. The locking tooth 96 secures the thumbwheel 74 with the spool 14 at the predetermined second-obtuse angle of rotation. As shown in FIGS. 11 and 12, when the spool 14 is at the predetermined second-obtuse angle of rotation 46 the indicator flag 30 is at the same angle and, therefore is positioned in the window 36 to provide a visual film-completely-exposed warning or indication.

Figure 17:
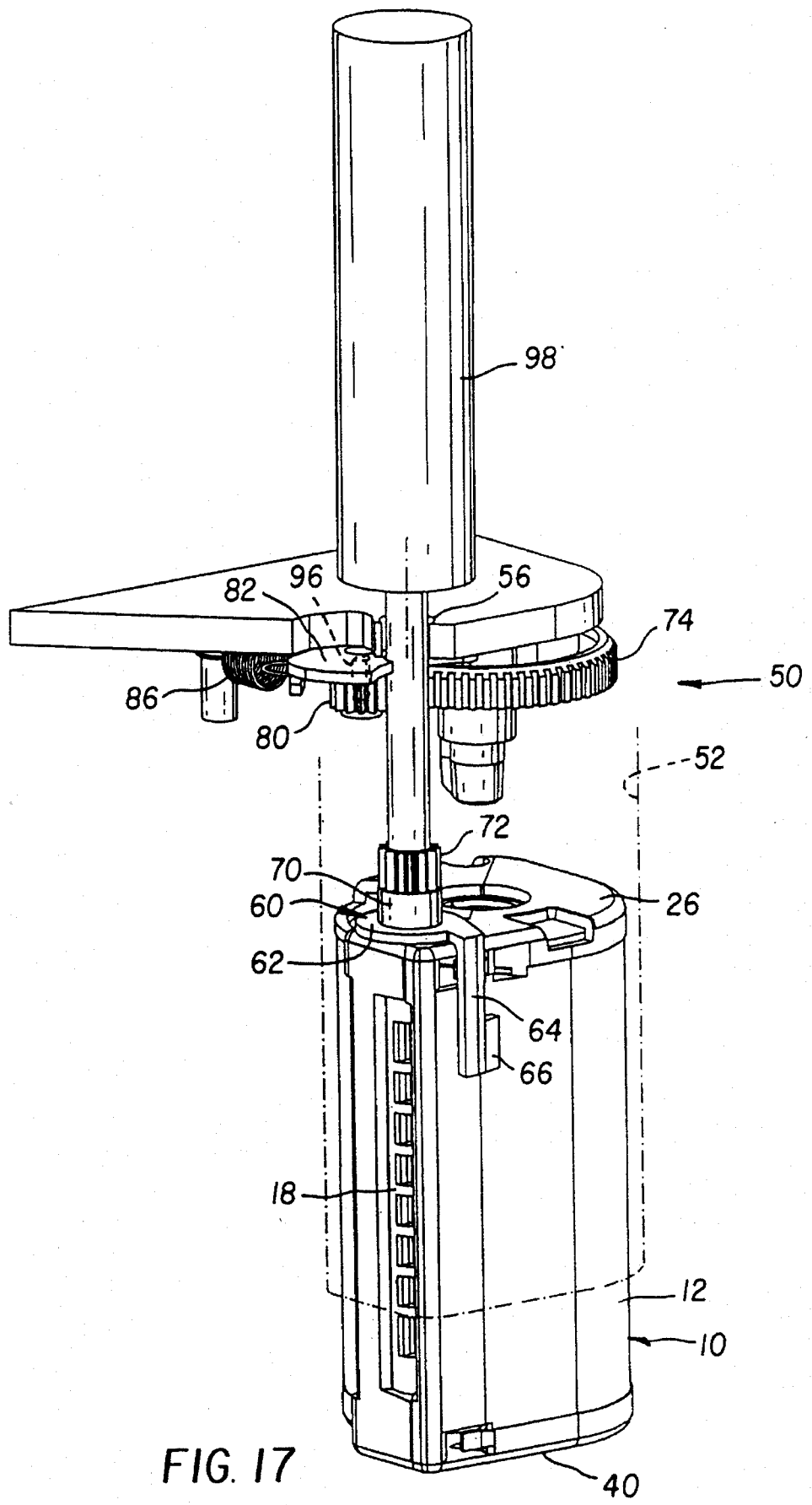

Also, the locking lever 82 uncovers the tool ingress opening 56 in the top housing portion 54. Then, as shown in FIGS. 16 and 17 a manual insertion tool 98 can be inserted through the ingress opening 56 and against the first spur gear 72 to force the actuator unit 60 and the film cassette 10 downward in the chamber 52 and out of the bottom of the chamber. The film cassette 10 is pushed against the bottom lid 58 to pop the bottom lid away from the chamber.

Figure 18:
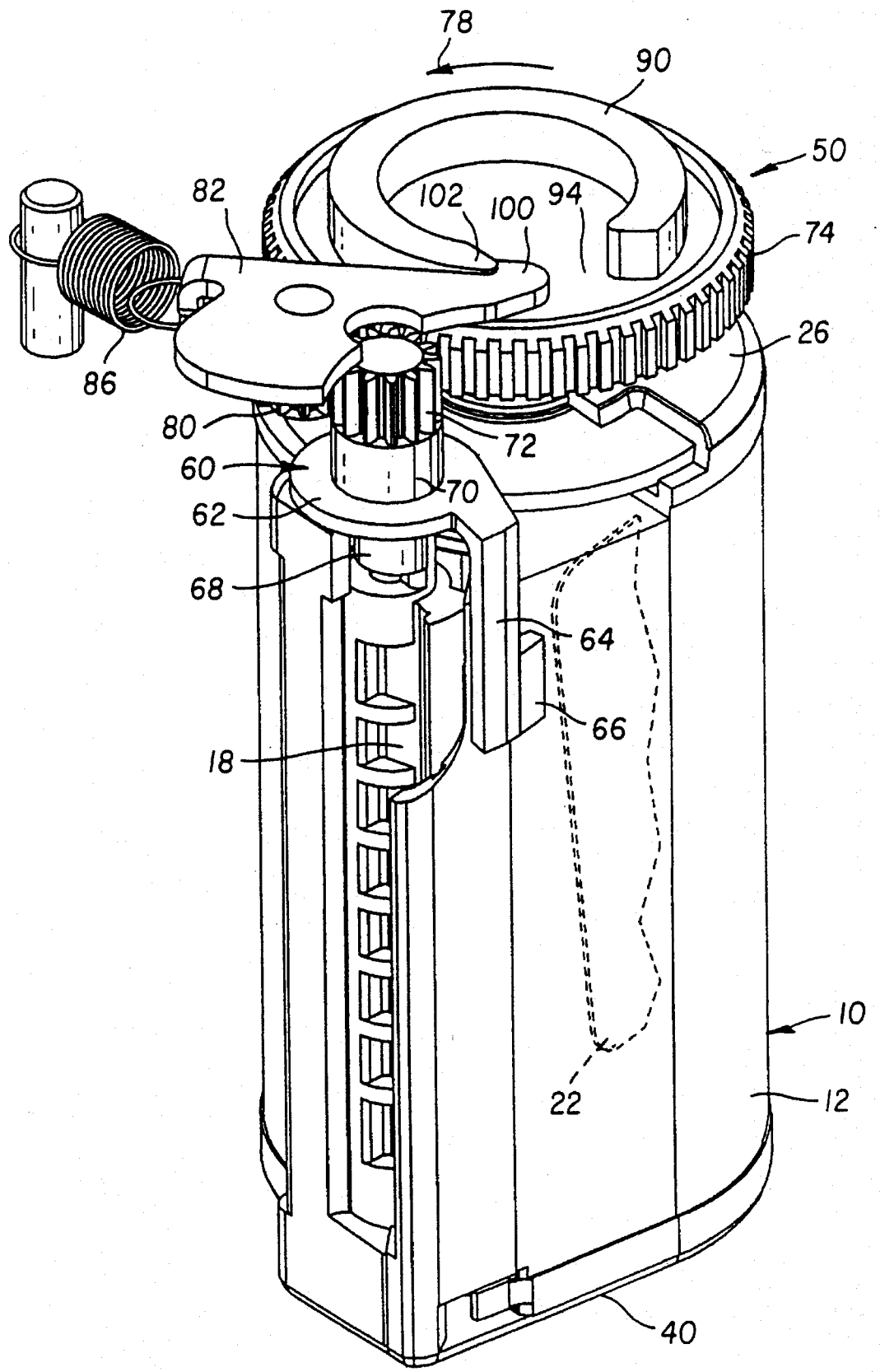
FIG. 18 is an assembled partial perspective view of the camera with the film cassette, according to an alternate embodiment of the invention.

The invention has been described with reference to a preferred embodiment. However, it will be appreciated that variations and modifications can be effected by a person of ordinary skill in the art without departing from the scope of the invention. For example, instead of the locking tooth 96 on the underside of the locking lever 82, the lever end 88 can have a hooked end 100 that engages one end 102 of the arcuate rib 90 as shown in FIG. 18 to prevent further rotation of the thumbwheel 74 in the film winding direction 78 (much in the same way the locking tooth does).

PARTS LIST 10. film cassette
12. cassette shell
14. flanged spool
16. filmstrip
18. light lock
20. slot
22. trailing film end portion
24. drive cavity
26. drive end
28. drive cavity
30. indicator flag
32. window
34. window
36. window
38. window
40. VEI end
42. acute angle of rotation
44. first-obtuse angle of rotation
46. second-obtuse angle of rotation
48. third-obtuse angle of rotation
50. camera
52. cassette chamber
54. top housing portion
56. tool ingress opening
58. bottom lid
60. actuator unit
62. driver
64. film sensor lever
66. sensor head
68. drive-part
70. gear-support-part
72. first spur gear
74. film rewind thumbwheel
76. drive-part
78. film winding direction
80. second spur gear
82. locking lever
84. mount-pin
86. tension spring
88. lever end
90. arcuate rib
92. slight distance
94. gap
96. locking tooth
98. insertion tool
100. hooked lever end
102. rib end

We claim:

1. A camera for use with a film cassette having a spool rotatable to wind an exposed filmstrip including a trailing film end portion into the cassette and a light lock movable to be closed after the trailing film end portion is wound into the cassette, is characterized in that:

a manual film winder is rotatable in engagement with the spool in a film winding direction to rotate the spool in the same direction to wind the exposed filmstrip including the trailing film end portion into the cassette; and locking means, separate from the film cassette, is coupled with the light lock and said film winder to prevent further rotation of said film winder in the film winding direction when the light lock is closed.

2. A camera as recited in claim 1, wherein the cassette has an indicator flag rotatable coaxially with the spool to be positioned in an indicator window of the cassette to provide a visual film-exposed warning when the spool is at a predetermined angle of rotation, and said locking means secures said film winder at the same angle of rotation to position the indicator flag in the indicator window of the cassette when the light lock is closed.

3. A camera as recited in claim 2, wherein spring means urges said locking means against said film winder when the trailing film end portion is wound into the cassette to position the locking means in order to secure the film winder when the film winder is at the predetermined angle of rotation.

4. A camera for use with a film cassette having a spool rotatable to wind an exposed filmstrip including a trailing film end portion into the cassette and an indicator flag rotatable coaxially with the spool to be positioned in an indicator window of the cassette to provide a visual film-exposed warning when the spool is at a predetermined angle of rotation, is characterized in that:

a manual film winder is rotatable in engagement with the spool in a film winding direction to rotate the spool in the same direction to wind the exposed filmstrip including the trailing film end portion into the cassette; and locking means, not a component of the film cassette, is coupled with said film winder for securing said film winder at the predetermined angle of rotation to position the indicator flag in the indicator window of the cassette after the trailing film end portion is wound into the cassette.

5. A camera as recited in claim 4, wherein spring means urges said locking means against said film winder when the trailing film end portion is wound into the cassette to position the locking means in order to secure the film winder when the film winder is at the predetermined angle of rotation.

* * * * *